(12) United States Patent
Cox et al.

(10) Patent No.: US 8,566,603 B2
(45) Date of Patent: Oct. 22, 2013

(54) MANAGING SECURITY OPERATING MODES

(75) Inventors: Jason R. Cox, Firestone, CO (US); Christopher J. Demattio, Longmont, CO (US); Monty A. Forehand, Loveland, CO (US); Michael B. Danielson, Longmont, CO (US); James C. Hatfield, Johnstown, CO (US); Manuel A. Offenberg, San Francisco, CA (US)

(73) Assignee: Seagate Technology LLC, Cupertino, CA (US)

( * ) Notice: Subject to any disclaimer, the term of this patent is extended or adjusted under 35 U.S.C. 154(b) by 235 days.

(21) Appl. No.: 12/815,216

(22) Filed: Jun. 14, 2010

(65) Prior Publication Data

US 2011/0307709 A1    Dec. 15, 2011

(51) Int. Cl.
*G06F 21/00* (2013.01)
*G06F 12/14* (2006.01)

(52) U.S. Cl.
USPC ............. 713/183; 713/193; 726/7; 380/45; 380/277

(58) Field of Classification Search
USPC ........................................... 713/183
See application file for complete search history.

(56) References Cited

U.S. PATENT DOCUMENTS

| 5,375,243 | A | * | 12/1994 | Parzych et al. | 726/17 |
| 5,972,693 | A | * | 10/1999 | Rothberg et al. | 435/287.2 |
| 7,099,491 | B2 | * | 8/2006 | Takaku | 382/100 |
| 7,117,179 | B2 | * | 10/2006 | Kim et al. | 705/51 |
| 7,634,447 | B2 | * | 12/2009 | Kim et al. | 705/51 |
| 7,734,934 | B2 | * | 6/2010 | Zimmer et al. | 713/193 |
| 8,140,437 | B2 | * | 3/2012 | Kim et al. | 705/51 |
| 2003/0023867 | A1 | | 1/2003 | Thibadeau | |
| 2003/0163430 | A1 | * | 8/2003 | Takaku | 705/52 |
| 2004/0228493 | A1 | * | 11/2004 | Ma | 380/286 |
| 2005/0066191 | A1 | | 3/2005 | Thibadeau | |
| 2005/0120118 | A1 | | 6/2005 | Thibadeau | |
| 2005/0160281 | A1 | | 7/2005 | Thibadeau | |
| 2005/0262361 | A1 | | 11/2005 | Thibadeau | |
| 2005/0268114 | A1 | | 12/2005 | Thibadeau | |

(Continued)

FOREIGN PATENT DOCUMENTS

EP     911738 A2 *  4/1999

OTHER PUBLICATIONS

Seagate Technology LLC, Technology Paper—"Can Your Computer Keep a Secret? Why All Laptop Data Protection Methods are NOT Created Equal," Oct. 2007, http://www.seagate.com/docs/pdf/whitepaper/HDpasswrd_TP580-1-0710US.pdf, 4 pages.

(Continued)

*Primary Examiner* — Kambiz Zand
*Assistant Examiner* — Yonas Bayou
(74) *Attorney, Agent, or Firm* — Cesari & Reed, LLP; Kirk A. Cesari

(57) ABSTRACT

A storage device that supports Trusted Computer Group (TCG) security allows management of TCG security features by a Basic Input/Output System (BIOS) using non-TCG security commands supported by the BIOS. In one implementation, a BIOS that does not support TCG security but does support ATA security can use ATA drive unlock to invoke TCG drive unlock on the storage device. Further, the storage device can be transitioned among multiple security operating modes (e.g., Undeclared, ATA security or TCG security).

19 Claims, 7 Drawing Sheets

(56) References Cited

U.S. PATENT DOCUMENTS

| | | | |
|---|---|---|---|
| 2006/0174352 A1 | 8/2006 | Thibadeau | |
| 2006/0218412 A1 | 9/2006 | Hars et al. | |
| 2006/0218647 A1 | 9/2006 | Hars et al. | |
| 2006/0259785 A1 | 11/2006 | Thibadeau | |
| 2006/0259895 A1 | 11/2006 | Thibadeau | |
| 2006/0277600 A1 | 12/2006 | Goodwill et al. | |
| 2006/0288237 A1 | 12/2006 | Goodwill et al. | |
| 2007/0174920 A1 | 7/2007 | Thibadeau | |
| 2007/0180210 A1 | 8/2007 | Thibadeau | |
| 2007/0250710 A1 | 10/2007 | Thibadeau | |
| 2007/0250734 A1 | 10/2007 | Thibadeau | |
| 2007/0250915 A1 | 10/2007 | Thibadeau | |
| 2008/0022134 A1* | 1/2008 | Wang | 713/193 |
| 2008/0072071 A1 | 3/2008 | Forehand et al. | |
| 2008/0155262 A1 | 6/2008 | Beaver et al. | |
| 2008/0168247 A1 | 7/2008 | Goodwill et al. | |
| 2008/0240428 A1* | 10/2008 | Hobbet et al. | 380/45 |
| 2009/0024816 A1 | 1/2009 | Thibadeau | |
| 2009/0052669 A1* | 2/2009 | Ma | 380/277 |
| 2009/0080662 A1 | 3/2009 | Thibadeau | |
| 2009/0196417 A1 | 8/2009 | Beaver et al. | |
| 2009/0235109 A1 | 9/2009 | Thibadeau | |
| 2010/0106928 A1* | 4/2010 | Toda et al. | 711/163 |

OTHER PUBLICATIONS

Sun Bing, "Rambling on the Private Data Security," May 30, 2008, Syscan 08, Hong Kong, China, 38 pages.

"TCG Storage Interface Interactions Specification," Specification Version 1.0, Jan. 27, 2009, Trusted Computing Group, Inc., www.trustedcomputinggroup.org, 15 pages.

http://investorshub.advfn.com/boards/read_msg.aspx?message_id=45978245, Wave Systems (WAVX): Lenovo Hardware Password Manager uses a BIOS-based password, Jan. 27, 2010, 2 pages.

Thibadeau, R. and Willett, M., "Trusted Computing Group's Proposed Standard for Storage Device Security," http://www.analogzone.com/iot_0724.pdf, Jul. 21, 2006, 7 pages.

Thibadeau, R. et al., "Drive-level Security: Innovation for Securing Data at Rest," http://www.trustedcomputinggroup.org/files/resource_files/AC06E160-1D09-3519-ADDC3479462C930E/storagevisions1-07-1.pdf, Jan. 1, 2007, 11 pages.

http://en.wikipedia.org/wiki/Trusted_Computing_Group, "Trusted Computing Group," Apr. 2, 2010, 6 pages/.

Koehler, Alexander, "Distributed Trusted Computing: A Breakthrough in Enterprise Security," Sep. 4-6, 2006, Germany, http://www.ict-economic-impact.com/layer2/Storage_Networking_World_2006_Seagate_AWK.pdf, 27 pages.

Beger, Brian, "Guide to Trusted Computing," Computer Technology News, http://www.itsecurityjournal.com/index.php/Latest/Guide-to-Trusted-Conputing.html, 2008, 5 pages.

Leclaire, Jennifer, "Trusted Computing Group Finishes Hard-Drive Specs," NewsFactor Network, Jan. 29, 2009, http://www.newsfactor.cominews/Hard-Drive-Security-Specs-Finished/story.xhtml?story_id=1110009AOSB68&full_skip=1, 4 pages.

* cited by examiner

MANAGING SECURITY OPERATING MODES

SUMMARY

A storage device manages security of a storage device that is provisioned using a first security protocol via security management of a second security protocol.

Other implementations are also described and recited herein.

BRIEF DESCRIPTIONS OF THE DRAWINGS

DETAILED DESCRIPTIONS

Figure 1:
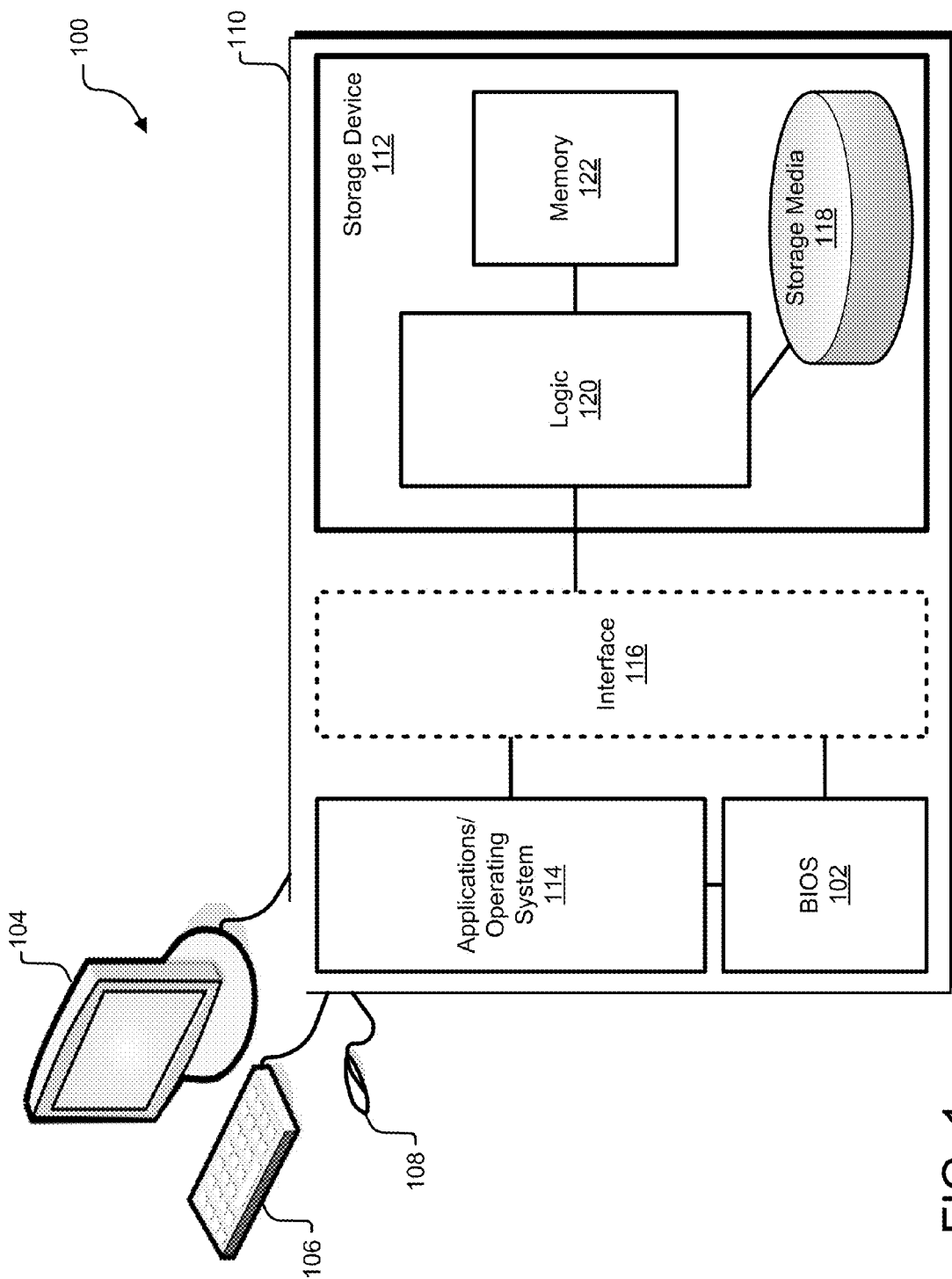
FIG. 1 illustrates an example TCG-supporting computing system with a BIOS that does not support TCG security.

The Trusted Computing Group (TCG) was established to develop standards for trusted computing components and software interfaces that can be implemented across multiple platforms without compromising the functional integrity of a computer or the privacy of a user. The TCG has developed various security specifications relating to desktop and mobile computing devices, mobile devices, storage devices and networks. The primary goal is to protect a computer user's information assets (data, passwords, security keys, etc.) from unauthorized access, such as software attacks and manual theft. One aspect of TCG storage device security involves disc encryption, in which disc read/writes are passed through hardware decryption/encryption logic and access to data is managed by passwords for individual portions of the storage media. For example, a first range of LBAs (or band or portion) of the storage media may be protected by encryption based on a first password, a second band of the storage media may be protected by encryption based on a second password, etc. It should be understood that a single password can protect multiple portions of the storage media.

However, considerations exist as the TCG Storage Work Group (SWG) Core Specification is implemented into computing and storage platforms. One consideration is that the Basic Input/Output System (BIOS) firmware of many computing systems, new and old, does not support the TCG Storage Work Group (SWG) Core Specification. BIOS vendors have significant space constraints in which to implement security enhancements, and BIOS modifications are difficult to deploy to customers. For these and other reasons, BIOS vendors have been slow to implement and deploy BIOS enhancements to support TCG. Nevertheless, there are times during operation when access to TCG features by or through the BIOS is desirable (e.g., coming out of a standby mode). The described technology provides management of TCG security features by the BIOS using non-TCG security commands supported by the BIOS.

Another consideration is that the TCG Storage Work Group (SWG) Core Specification may need to coexist on a storage device with a security protocol other than TCG. Implementations such as this can benefit from defined methods of transition between security operating modes of each security protocol. The described technology defines transition methods between TCG Storage Work Group (SWG) Core Specification security operating mode and a security operating mode for another security protocol (e.g., ATA Security, etc.).

Most hard disc drive manufacturers offer a feature referred to as the "ATA security feature set" but commonly known as "ATA hard drive password locking". In contrast to other computer security features, such as BIOS or operating system (OS) password protection, an ATA security protocol provides an ATA password locking that is implemented in the hard disc drive. Even if a required operating system password and any BIOS-level password protection is satisfied, removed, or otherwise, circumvented, an ATA security protected hard drive will not retrieve data unless the correct ATA password is presented to the drive. However, although ATA security provides some protections, stronger security is possible, such as security features specified by the Trusted Computer Group.

The Trusted Computer Group, and particularly the TCG Storage Work Group (SWG), has worked to develop standard specifications for enhanced, industry-wide protection of stored data, primarily through the use of full disc encryption and strong access control. As part of this effort, the TCG security protocol defines interfaces to allow applications, operating systems, and the BIOS to take advantage of the TCG security features to access the data on encrypted storage devices. It should be understood that, while the present description focuses on hard disc drives, other storage devices may employ an implementation of the described technology, including solid state drives (SSDs).

A security protocol represents a convention or standard that controls or enables security management. Generally, a security protocol can be defined as the rules governing the syntax, semantics, and state transitions for security management. A security protocol may be specified using a formal description of message formats and the rules for exchanging those messages. Protocols may be implemented by hardware, software, or a combination of the two. For example, one or more versions of the TCG SWG Core Specification specify portions of the TCG security protocol, whereas the ATA security protocol is specified by one or more versions of the ATA Specification.

Furthermore, although applications and operating systems are rapidly adopting and supporting the TCG SWG Core Specifications, BIOS vendors are slow to implement and deploy TCG SWG features in the BIOS. However, in certain circumstances, such as resuming operation after standby/sleep mode, an application or an operating system may not yet be available when storage access is required or desired, so the BIOS may be responsible for unlocking encrypted data on a TCG-encrypted storage device. If the BIOS does not support the TCG security, then the described technology may be employed to allow the TCG-unaware BIOS to unlock the storage device and access the TCG-encrypted data. Note: The TCG develops a variety of security-related specifications, including the Enterprise SSC, Opal SSC, and the Core Spec, among others, which may be implicated in part or in full within the TCG security protocol supported by the described technology.

In ATA security, locking refers to disabling host access to data on the storage media. In one implementation, an ATA locked storage device refuses to return data from the storage media in response to a host request for such data. Note: It should be understood that some implementations of ATA security may also include encryption/decryption of stored data in addition to ATA drive locking/unlocking ATA unlocking refers to enabling host access to data on the storage media, subject to provision of a user password or master password. In contrast, TCG security involves encryption of data on the storage media. As such, a TCG locked storage device (or a portion of the storage media) refuses to decrypt TCG-encrypted data on the storage media and return it to a requesting host. TCG unlocking, therefore, refers decrypting TCG-encrypted data from one or more portions of the storage media and returning the decrypted in response to a host data access request, subject to provision of a TCG password.

FIG. 1 illustrates an example TCG-supporting computing system 100 with a BIOS 102 that does not support or is unaware of TCG security. The computing system 100 is shown with a display device 104, a couple of input devices (i.e., a keyboard 106 and a mouse 108), and a computing enclosure 110. The computer enclosure 110 is shown as including a storage device 112, applications/operating system 114, and an interface 116 defined between the storage device 112 and the applications/operating system 114 and between the storage device 112 and the BIOS 102. The interface 116 represents circuitry and/or software that allow the applications/operating system 114 and the BIOS 102 to interact with the storage device 112 to manage security features and access the one or more storage media 118 of the storage device 112. For example, in one implementation, the interface 116 includes an ATA security interface and a TCG security interface for communicating with logic 120 in the storage device 112.

The storage device 112 provides TCG-based security features and includes the logic 120, memory 122, and the storage media 118. The logic 120 processes commands received through the interface 116 and responds accordingly. For example, if the applications/operating system 114 issues a TCG drive unlock command to the storage device 112 through the interface 116, the logic 120 processes the command (e.g., ensures that the host has properly proven its identity, such as by providing a proper password with the drive unlock command, and unlocks appropriate portions of the storage media 118, if any) and responds with the results of the attempted drive unlock operation. As part of such processing, the logic 120 may access a reserved data region of the storage media 118 to confirm the host's identity. In some implementation, some or all of the security metadata is stored in this reserve data region of the storage media 118. For example, the logic 120 may compare a password received with the TCG drive unlock command against one or more passwords stored in the reserved data region of the storage media 118 and associated with one or more portions of the storage media 118.

In one implementation, the computing system 100 is capable of supporting both ATA security features as well as TCG security features. When the computing system 100 is first configured, the computing system 100 is initially in a default Security Operating Mode 0 (SOM0), in which neither ATA security nor TCG security are configured. SOM0 is considered the default mode for an unconfigured computing system. The user may elect to leave the computer system in SOM0 or configure the computing system 100 to provision either ATA security or TCG security features. For example, the user may elect to provision ATA security by locking the storage device using an ATA user password or ATA master password or to provision TCG security by configuring the storage device for encryption and locking using a TCG password. Alternatively, the user may elect to configure the computing system 100 for ATA Locking mode but still support TCG Admin mode. Details of the transition out of SOM0 into either SOM1 (ATA Locking) or SOM2 (TCG Locking) are provided with regard to FIGS. 2 and 3.

After an initial configuration of the computing system 100 to support TCG security, the applications/operating system 114 primarily interacts with the storage device 112 to manage the TCG security features. For example, in some implementations of an S5 Power on Reset operation, the applications/operating system 114 (e.g., using a boot kernel, software and data stored in a shadow master boot record or shadow MBR) is responsible for unlocking the storage device 112 prior to rebooting to the main operating system. In one implementation, a shadow MBR represents an alternate copy of a primary MBR (plus potentially other data) that is temporarily used in place of the primary MBR during the boot process until a storage device is unlocked and the shadow MBR is deactivated. It should be understood that other boot methods may also be employed in the described technology, including without limitation a GPT (GUID partition table).

On boot from initial power, the TCG drive is locked and the shadow MBR is present and not locked on the storage media 118. When the BIOS 102 attempts to read the MBR in the storage device 112, its read request is redirected to the shadow MBR, which includes instructions for unlocking the storage device 112 (subject to authentication) and for resetting the BIOS 102. After the storage device 112 is unlocked, the shadow MBR is deactivated, and the BIOS 102 is reset and then boots the primary MBR (or is directed to reboot). The BIOS 102 then transfers control to the applications/operating system 114, which have access to unlocked data recorded on the storage device 112 until the storage device 112 is powered down or otherwise locked. (It should be understood that in some implementations the shadow MBR is not locked and therefore may be accessed unconditionally.)

Additionally, in some implementations of an S4 Hibernation operation, the applications/operating system 114 writes all system memory to the storage device 112, shuts down system memory, and powers down the computing system 100. Resuming operation from S4 Hibernation mode then employs a boot process similar to that described with regard to S5 Power on Reset operation.

However, in some implementations of an S3 Standby/Sleep operation, there is no boot process during the resume to allow the shadow MBR to unlock the storage device 112. Further, the pre-Standby/Sleep system memory is preserved, such that the applications/operating system 114 is already loaded. As such, there is no available location in memory for an application to execute a TCG Unlock command. Therefore, in this circumstance, the BIOS 102 is the only system resource available to unlock the storage device 112, even if it does not support or is unaware of TCG security. Details of resuming from S3 Standby/Sleep operation are provided with regard to FIGS. 4, 5 and 6.

In summary, the description relating to FIG. 1 sets up an operating environment in which a storage device supports both TCG security and ATA security. However, it should be understood that the described technology may be employed with a different combination of security and interface protocols (e.g., SCSI, USB, IEEE 1667, etc.). Such a storage device may be initially configured in an undeclared security state, referred to herein as Security Operating Mode 0 (SOM0), but may be subsequently provision by a user or administrator into an ATA security mode (SOM1) or TCG security (SOM2). Furthermore, in one implementation, the user or administrator may revert the storage device back to SOM0 and then again to either one of the security states, SOM1 or SOM2. In this manner, the security device may be flexibly managed among the various Security Operating Modes, as described with regard to FIGS. 2 and 3. Thereafter, FIGS. 4, 5, and 6 and their corresponding descriptions relate to use of an ATA Security Unlock command by a TCG-unaware BIOS to send a password that is compared against TCG passwords held by a TCG-provisioned storage device. FIG. 7 relates to a computing system in which a TCG-unaware BIOS and TCG-supporting storage device may be employed.

Figure 2:
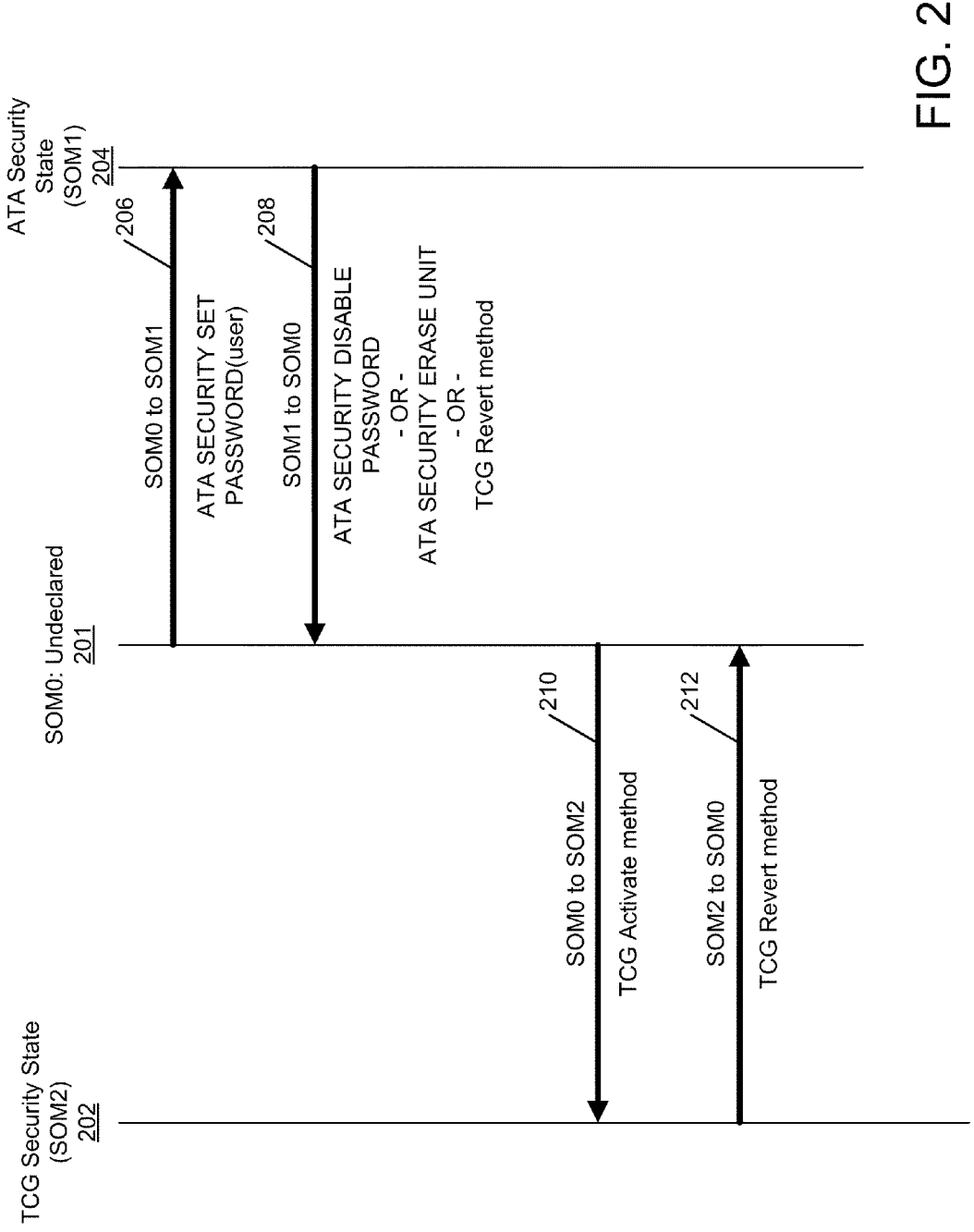
FIG. 2 illustrates a security state diagram relating to a TCG security state and an ATA security state.

FIG. 2 illustrates a security state diagram 200 relating to a TCG security state 202 and an ATA security state 204. In a Security Operating Mode 0 ("SOM0") 201, also referred to as "Undeclared operating mode 201", a computing system has not declared its intent to use one security mechanism or the other (e.g., ATA security versus TCG security). While in SOM0, neither drive locking mechanism is configured for the storage device and neither drive locking mechanism has exclusive control of the storage device.

In one implementation of SOM0, the storage device instead is receptive to both TCG and ATA security commands as well as most of the standard ATA commands. In SOM0, ATA security is disabled, but the ATA security state machine of the storage device is active and capable of processing appropriate ATA security commands. Depending on the ATA security commands received in SOM0, the ATA security state machine may be in any one of the ATA Security states SEC0 through SEC2 and behaves in accordance with the governing ATA standard specification. In one implementation, the TCG Locking Security Provider (the "Locking SP") resides in the Manufactured-Inactive state and is not managing drive locking, although the TCG Admin Security Provider ("Admin SP") is active. Although the descriptions herein focus on client implementations, it should be understood that the described technology may be employed in systems spanning from embedded systems to enterprise class environments, and even outside of that range.

A user or administrator may choose to configure a computing system to provide ATA Locking mode, designated as "SOM1". In SOM1, ATA drive locking is enabled via the ATA security interface and the locking functionality of the storage device may be managed using the standard ATA security commands. The ATA security state machine is active and capable of processing all ATA security commands. Depending on the ATA security commands received in SOM1, the ATA security state machine may be in any one of the SEC3 through SEC6 states and behaves in accordance with the governing ATA Specification. Modern storage devices typically support ATA drive locking, in which a storage device lock password prevents user access unless and until the correct password is provided. ATA drive locking is a common feature in most modern laptop computers. These ATA storage device lock passwords are generally not the same as BIOS passwords but are typically managed by the BIOS.

In SOM1, the state of the TCG Locking SP is Manufactured-Inactive, thereby preventing the Locking SP from managing drive locking When transitioning to SOM1, if the host successfully issues an ATA Set Password command to set the ATA user password and TCG security is not managing the TCG SID password, the storage device updates the TCG SID password with the new ATA user password (e.g., the TCG SID password is personalized, i.e., the TCG SID password is changed to a value other than the factory default). This approach ensures that the ATA user also controls certain functionality within the TCG security infrastructure, thereby locking out malicious users and processes that might exploit an unpersonalized TCG SID password. In one implementation, TCG security is not managing the TCG SID password if the TCG SID password has not been changed from its default value.

The storage device transitions from SOM0 to SOM1 (i.e., turning on ATA drive locking) in response to the host setting the ATA user password using the ATA SECURITY SET PASSWORD command 206. As a side effect of this transition, if the host has not personalized the TCG SID password on the Admin SP, the default TCG SID password on the Admin SP, is replaced with the specified ATA user password value. For hosts intending to use the ATA security interface completely, propagating the ATA user password to the TCG SID password of the Admin SP prevents other TCG-aware entities from taking ownership of the unclaimed TCG SID password. The host can still manage and utilize the TCG SID password through the TCG administrative interface so long as it knows the ATA user password.

The host transitions from SOM1 to SOM0 (i.e., turns off ATA drive locking) automatically, whenever any one of the following occurs (shown as communication 208):
 the host successfully disables the ATA user password using the ATA SECURITY DISABLE PASSWORD command;
 the host successfully erases the drive using the ATA SECURITY ERASE UNIT command;
 the host successfully invokes a supported TCG revert method on the TCG Admin SP.

Specific side effects of this transition depend upon the command used to invoke the transition. Nevertheless, the commands may result in the following common side effect:
 if ATA security is currently managing the TCG SID password, the value of the TCG SID password is restored to its default value, as specified in the TCG Security Subsystem Class Specification.

While in SOM0 and SOM1, the storage device presents the standard ATA security interface as specified in the governing ATA specification, with the modifications described herein. The ATA SECURITY ERASE UNIT command supports both the Normal and Enhanced erase modes with the following modifications:
 Normal Erase: Normal Erase is accomplished by changing the media encryption key for the storage device followed by an overwrite operation to the entire storage media, such as an overwrite operation that writes random data. On reading back the overwritten sectors, the returned data may or may not match what was written during the overwrite operation.
 Enhanced Erase: Enhanced Erase is accomplished by changing the media encryption key for the storage device, and overwriting of the entire storage media is not performed.

The ATA SECURITY ERASE UNIT command preserves the value of the ATA master password. In addition to their standard effects on the ATA security state machine, the ATA SECURITY ERASE UNIT, SECURITY SET PASSWORD, and SECURITY DISABLE PASSWORD commands have the additional side effects described herein.

Alternatively, a user or administrator may choose to configure a computing system to provide TCG Locking mode, designated as "SOM2". In SOM2, the TCG locking behavior of the storage device is determined by the portion (e.g., band or range) definitions within the TCG Locking SP. TCG drive locking is enabled via the TCG security interface and the locking functionality of the storage device may be managed using the standard TCG security commands. According to the TCG Storage Interface Interactions Specification, Specification Version 1.0, Jan. 27, 2009, Section 4.5.1.3, all ATA security commands are to be aborted when the storage device is in SOM1. However, in the described technology, an ATA drive unlock command is accepted and processed to allow a TCG-unaware BIOS to unlock a TCG-encrypted storage device. Also, an ATA Security Freezelock command may be accepted by the storage device. Although, the ATA Security Freezelock command results in no action by the storage device in SOM2, accepting the ATA Security Freezelock command maintains compatibility with BIOS implementations that may experience problems if the ATA Security Freezelock command were to be aborted.

The storage device transitions from SOM0 to SOM2 (i.e., turning on TCG drive locking), when the host executes the TCG activate method 210 on the SP object that represents the TCG Locking SP. On this transition, the media encryption key currently in use for the entire storage device is preserved as the media encryption key for the TCG Global Range.

The storage device transitions from SOM2 to SOM0 (i.e., turns off TCG drive locking) automatically, whenever the host invokes a TCG revert method 212 against any of the following entities: the Locking SP, the Admin SP or their corresponding objects in the Security Provider table on the Admin SP.

While in SOM2, the ATA security state machine is no longer in control of drive locking and the storage device does not support the ATA security feature set. The TCG locking interface is in control and, based on the configuration of the Locking SP, the storage device may expose a limited subset of the ATA security feature set as described herein. Other ATA security commands result in an interface status of COMMAND ABORTED.

In SOM2, the storage device accepts a properly formatted ATA SECURITY FREEZELOCK command. The command does not affect the TCG interface or the ability of the drive to process further permitted ATA security commands.

As long as the storage device has at least one TCG band that allows ATA unlock, or if the shadow MBR is active, the ATA SECURITY UNLOCK command is permitted; otherwise, the command returns an interface status of COMMAND ABORTED. When permitted, the ATA SECURITY UNLOCK command verifies the specified password against:

any TCG credential having an associated authority that is permitted to set both the Read/WriteLocked attributes on the band that allows ATA Unlock; and
  when the shadow MBR is active (e.g., when MBRControl table's Enable column value is TRUE and Done column is FALSE), any TCG password associated with an authority permitted to set the Done column of the MBR-Control table.

If the password matching succeeds:
If the password matches the value of an appropriate lock/unlock authority's password, the Read/WriteLocked attributes for the band is set to Unlocked.
If the password matches the value of an appropriate admin authority's password, the Done attribute for the shadow MBR is set to True.

If the password fails to match any of the targeted TCG passwords, the ATA SECURITY UNLOCK command returns an interface status of COMMAND ABORTED and the retry counter for the ATA security interface is decremented. In SOM2, there is no distinction between ATA user and ATA master passwords, and the storage device ignores the "Compare User/Master Password" bit in the ATA SECURITY UNLOCK command. Also, in SOM2, the retry counter on the ATA security interface is not reset on successful invocation of ATA SECURITY UNLOCK.

Figure 3:
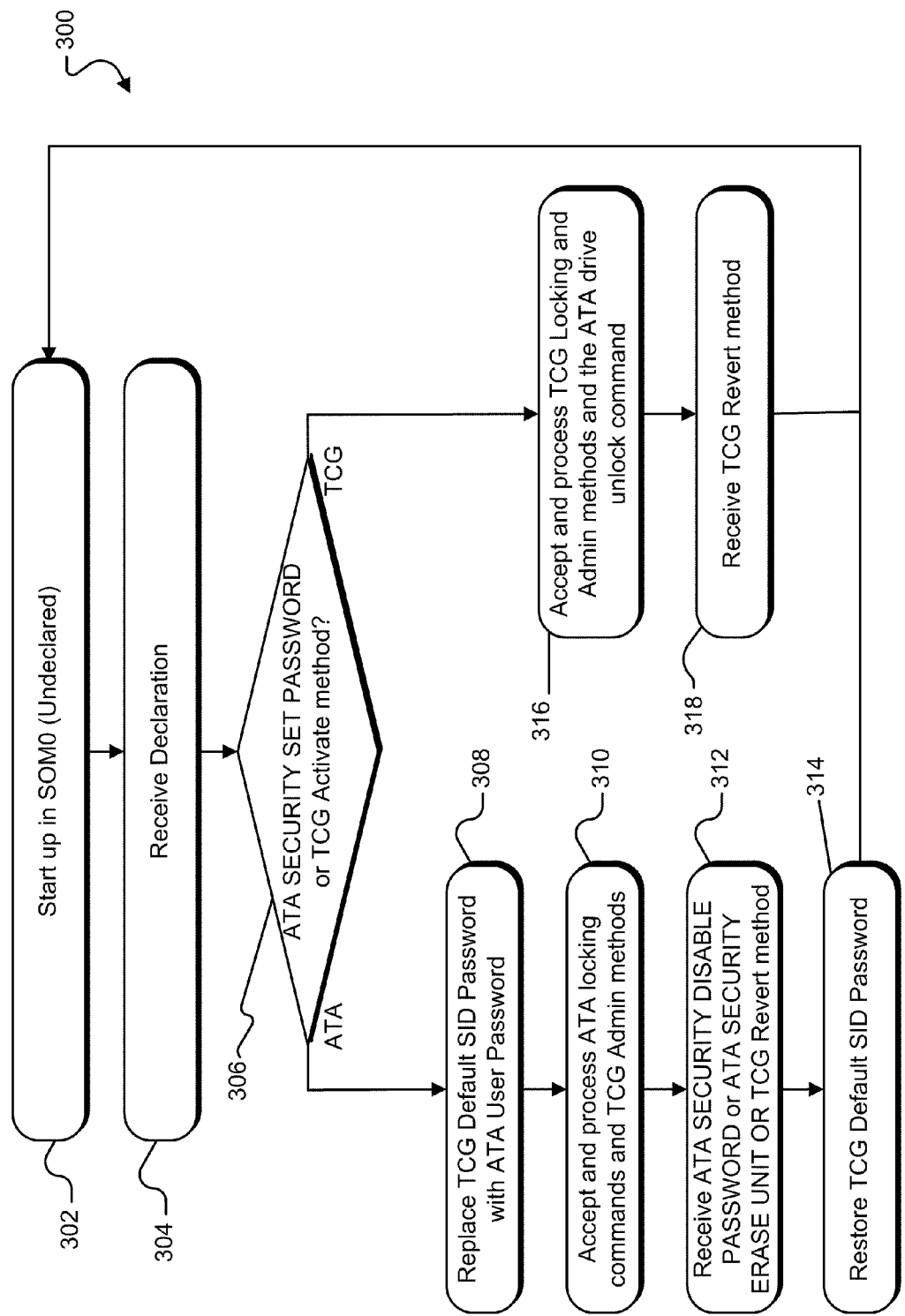
FIG. 3 illustrates example operations for transitioning into a TCG security state or an ATA security state.

FIG. 3 illustrates example operations 300 for transitioning into a TCG security state or an ATA security state. An initial operation 302 starts the computing system in an undeclared state (SOM0), in which neither TCG security nor ATA security exclusively controls the storage device. However, both the TCG security state machine and the ATA security state machine are capable of processing appropriate security commands.

A declaration operation 304 receives a command to initiate either TCG security or ATA security. A decision operation 306 determines whether the declaration is a TCG Admin template method (e.g., activate) or an ATA security command (e.g., ATA SECURITY SET PASSWORD (user)), the former initiating the TCG security mode and the latter initiating the ATA security mode.

If the declaration initiates ATA security mode, then a replacing operation 308 replaces the TCG SID password with the ATA user password provided with the ATA SECURITY SET PASSWORD (user) command, if the TCG SID password is still the default. If the TCG SID password has been personalized (e.g., by the user or administrator), then it is not replaced. In this manner, the TCG default SID password, which can be compromised, is replaced by the ATA user password to prevent malicious processes from gaining access to the storage device through the known TCG default SID password.

An ATA security operation 310, which operates in the ATA Security State, accepts and processes ATA Security commands and TCG Admin methods based on the ATA user password. For example, a storage device in an ATA Security State can accept and process both ATA Security commands and TCG Admin methods. The ATA security operation 310 continues until the ATA Security State is disabled in a disable operation 312 based on a specific ATA or TCG disable command (e.g., ATA SECURITY DISABLE PASSWORD, ATA SECURITY ERASE UNIT, TCG revert method). A restoring operation 314 restores the TCG password to the TCG default SID password, if the TCG default SID password was previously replaced with the ATA user password. Processing then returns to the initial operation 302 and the undeclared state (SOM0).

If the decision block 306 determines that the declaration initiates TCG security mode, then a TCG security operation 316 accepts and processes TCG locking commands and TCG Admin commands based on the one or more passwords passed to the TCG Locking SP, the TCG Admin SP, and the ATA drive unlock command (from the BIOS). The TCG security operation 316 continues until the TCG Security State is disabled in a disable operation 318 based on a specific TCG disable commands (e.g., a TCG revert method). Processing then returns to the initial operation 302 and the undeclared state (SOM0).

Figure 4:
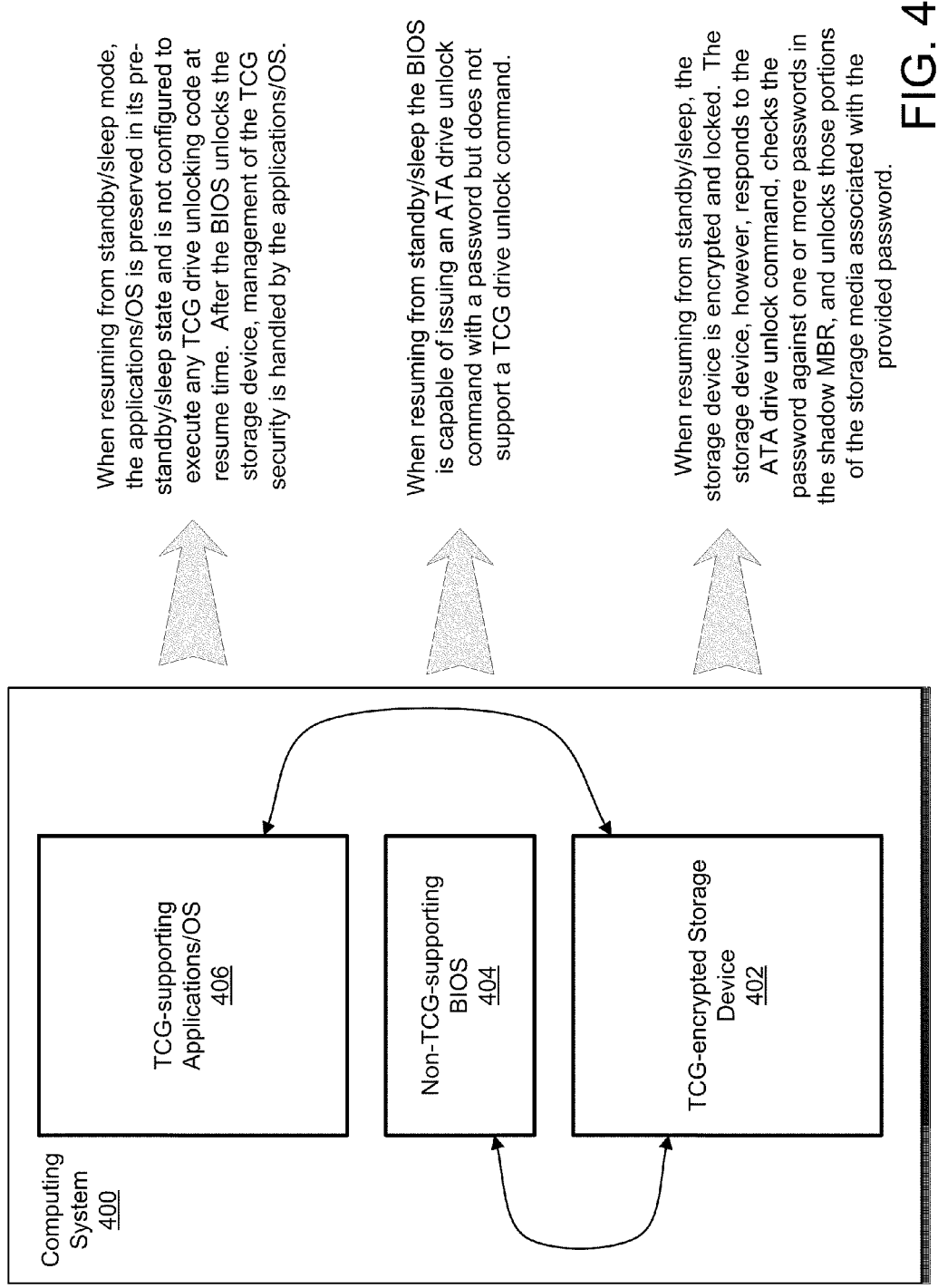
FIG. 4 illustrates software layers of a computing system and their individual capabilities relating to unlocking a TCG-encrypted storage device.

FIG. 4 illustrates software layers of a computing system 400 and their individual capabilities relating to unlocking a TCG-encrypted storage device 402 (while in SOM2) when resuming from standby/sleep mode. The BIOS 404 is assumed to not support TCG security, but the application/operating system 406 does support TCG security. The described technology provides a mechanism for enabling the TCG-unaware BIOS 404 to unlock the storage device 402 using non-TCG security commands when resuming from an S3 Standby/Sleep operation. In one implementation, in order for the TCG-unaware BIOS 404 to unlock a TCG-encrypted storage device when resuming from an S3 Standby/Sleep operation, the BIOS 404 issues an ATA drive unlock command, which the TCG Storage Interface Interactions Specification requires the TCG-encrypted storage device 406 to ignore. See TCG Storage Interface Interactions Specification, Specification Version 1.0, Jan. 27, 2009, Section 4.5.1.3. However, in the described technology, the ATA drive unlock command includes the TCG password, which the storage device 402 checks against the one or more passwords stored in the shadow MBR. The storage device 402 therefore unlocks any portions of the storage device and/or shadow MBR protected by the TCG password passed in the ATA Unlock command. Thereafter, processing control is handed off to the applications/operating system 406, which takes over the TCG security management.

Figure 5:
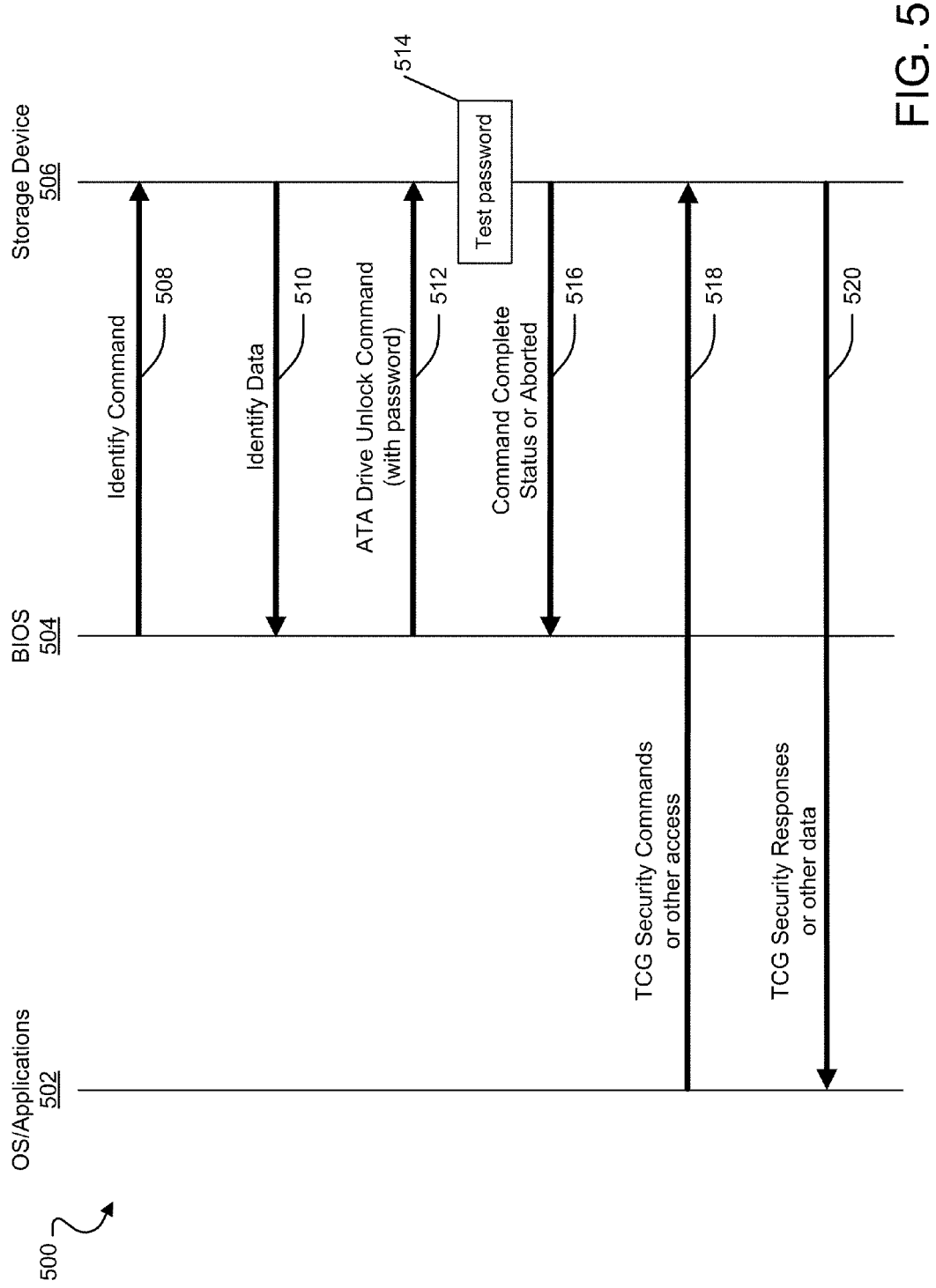
FIG. 5 illustrates communications among a BIOS, an application or operating system, and a TCG-supporting storage device after standby/sleep mode.

FIG. 5 illustrates communications 500 among a BIOS 504, an application or operating system 502, and a TCG-supporting storage device 506 after standby/sleep mode while in SOM2. The BIOS is unaware of or does not support TCG security commands. Nevertheless, the illustrated communications are initiated by the BIOS 504 when the computing system in which the storage device 506 resides resumes operation after standby/sleep mode (e.g., the lid of a laptop is opened after the laptop was suspended). In this state, the operating system/applications 502 are not equipped to unlock the storage device from a TCG drive lock state imposed when the computing device was suspended. Furthermore, there may be no available host memory in which to load an application capable of unlocking the TCG-locked storage device. As such, the responsibility for unlocking the storage device 506 falls to the TCG-unaware BIOS 504.

The BIOS 504 issues an identify command 508 to the storage device 506. The TCG-enabled and locked storage device 506 responds with identify data 510, which indicates whether the storage device 506 has ATA security supported and enabled or is locked by TCG and has shadow MBR set to true. If so, the BIOS 504 issues an ATA drive unlock command 512 with a password (e.g., a TCG password) to the storage device 506, which tests the password against one or more portions (e.g., bands or ranges of logical block addresses (LBAs)) in a test operation 514. Individual portions of the storage device, including the shadow MBR, may be locked by different passwords under TCG security. As such, each portion is tested against the password. If the password matches a portion of the storage media, the storage device unlocks that portion for access by the BIOS 504 and operating system/application 502.

Unless the password does not match the password of any portions of the storage device 506, the storage device 506 indicates that the ATA drive unlock command was completed successfully in a communication 516. The passwords are stored in a TCG Locking SP. If the password does not match the password of any portions of the storage device 506, then the storage device 506 indicates that the ATA drive unlock command was aborted in the communication 516.

The BIOS 504, having unlocked the necessary portions and/or the shadow MBR, can now hand off (e.g., transfers) processing to the operating system/applications 502, which can issue TCG security commands or other access requests 518 to the storage device 506. The storage device 506 responds to the TCG security commands or other access requests 520 as appropriate (e.g., with TCG security responses or other data).

Figure 6:
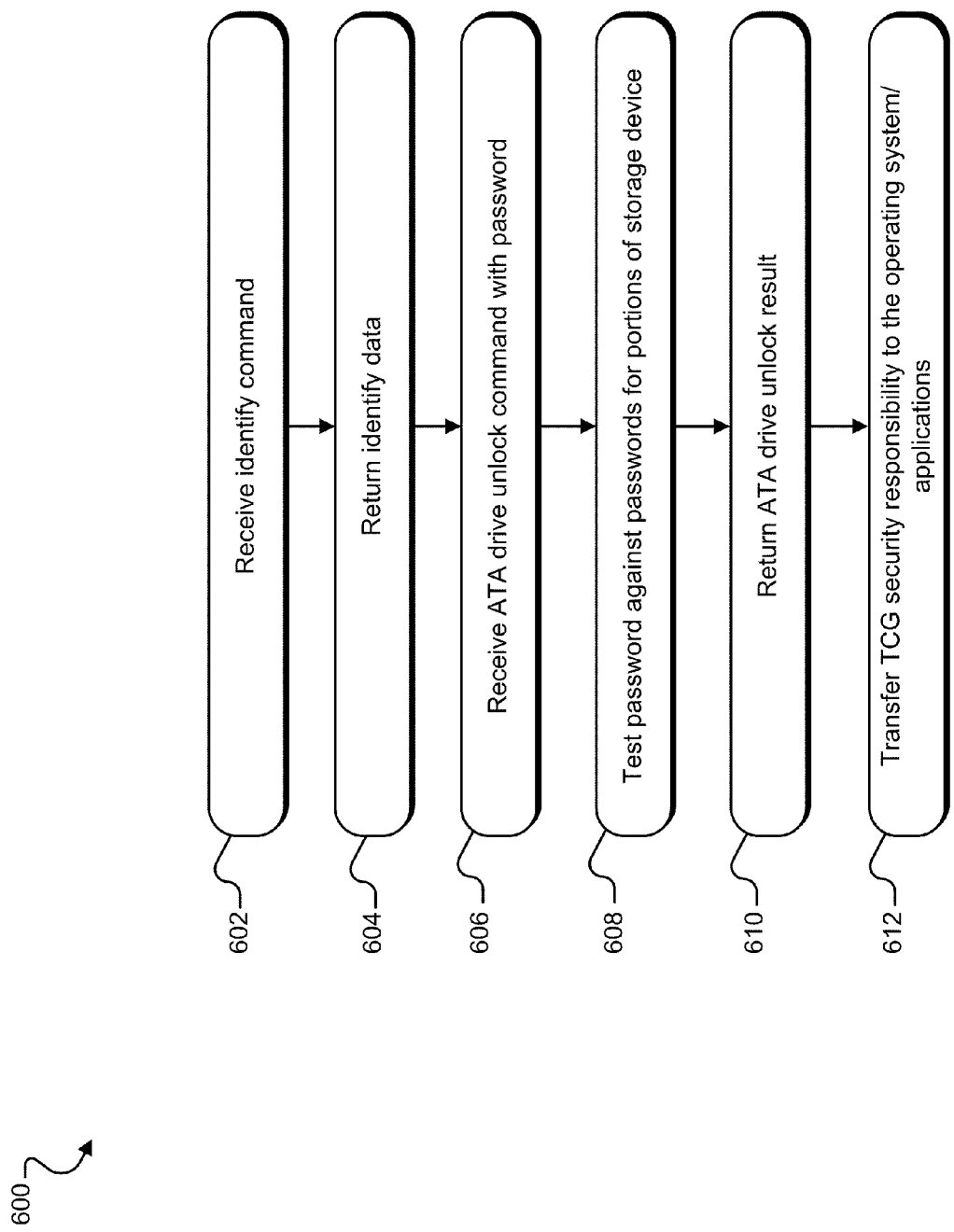
FIG. 6 illustrates example operations after standby/sleep mode.
Figure 7:
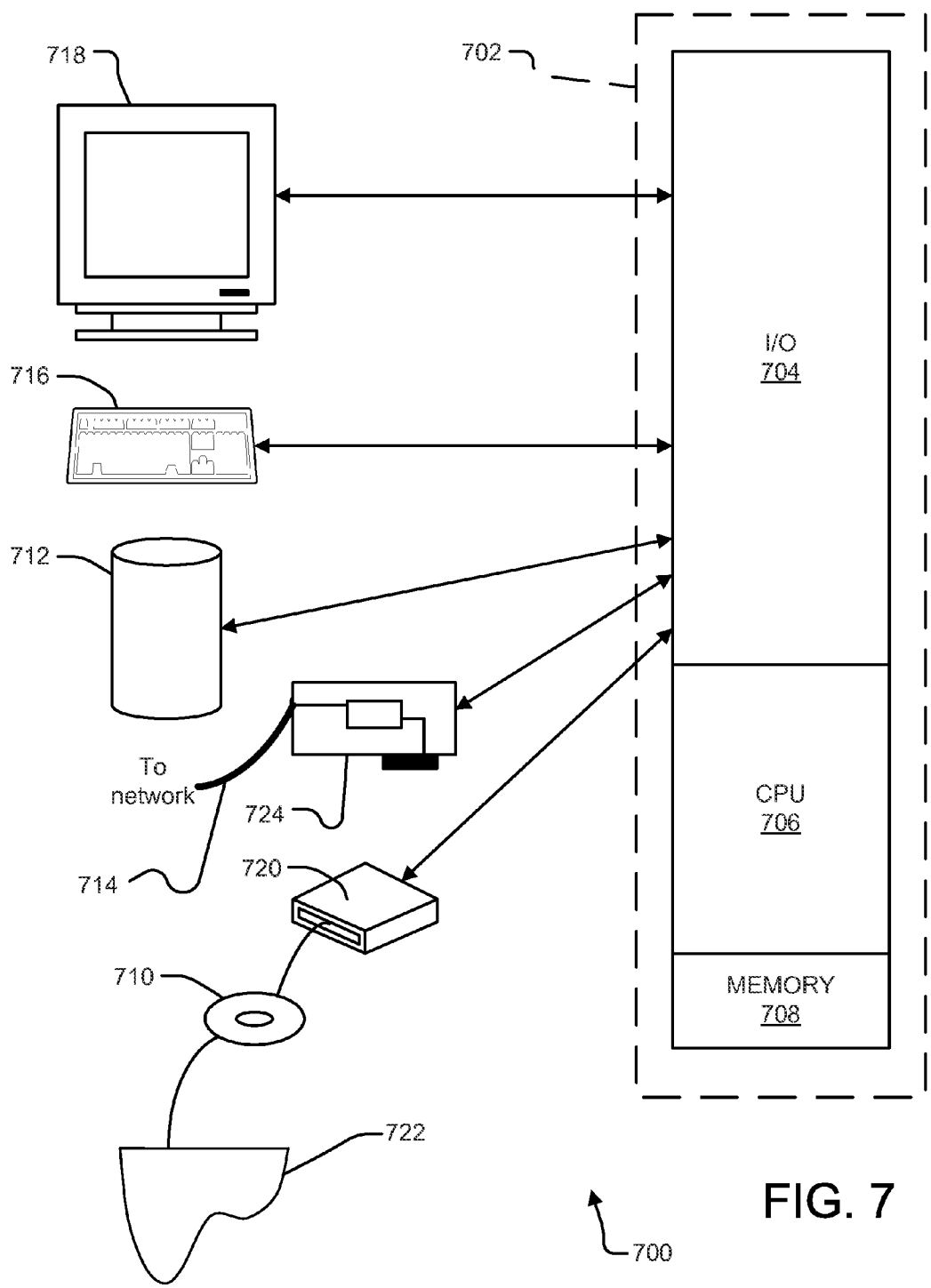
FIG. 7 illustrates an example computing system that can be used to implement the described technology.

FIG. 6 illustrates example operations 600 after standby/sleep mode while in SOM2. A receive operation 602 receives from a TCG-unaware BIOS an identify command, which in part asks the storage device to identify whether it supports ATA security and whether it is enabled to do so. A return operation 604 returns identify data, which in one implementation includes bits indicating whether the storage device supports ATA security and whether ATA is enabled on the storage device, and whether it is locked by TCG and shadow MBR is true.

If the storage device supports and is enabled for ATA security, a receive operation 606 receives an ATA drive unlock command with a TCG password. (Note: There may also be implementations where the storage device may or may not show ATA Security supported and enabled, but the BIOS can look at other identify bits to determine whether the storage devices is locked by TCG and shadow MBR is true.) A testing operation 608 tests the password against passwords associated with individual portions (e.g., bands or ranges of LBAs) of the storage device and/or against passwords that manage the shadow MBR. If the password matches a password of a portion, then the storage device unlocks that portion to enable decrypted access to the portion by the operating system/applications 502. A return operation 610 returns the result of the ATA drive unlock operation (e.g., success if at least one portion is unlocked, or abort). A handoff operation 612 hands off responsibility for TCG security from the BIOS to the operating system/applications, and resume for S3 is complete.

FIG. 7 illustrates an example computing system that can be used to implement the described technology. A general purpose computer system 700 is capable of executing a computer program product to execute a computer process. Data and program files may be input to the computer system 700, which reads the files and executes the programs therein. Some of the elements of a general purpose computer system 700 are shown in FIG. 7 wherein a processor 702 is shown having an input/output (I/O) section 704, a Central Processing Unit (CPU) 706, and a memory section 708. There may be one or more processors 702, such that the processor 702 of the computer system 700 comprises a single central-processing unit 706, or a plurality of processing units, commonly referred to as a parallel processing environment. The computer system 700 may be a conventional computer, a distributed computer, or any other type of computer. The described technology is optionally implemented in software devices loaded in memory 708, stored on a configured DVD/CD-ROM 710 or storage unit 712, and/or communicated via a wired or wireless network link 714 on a carrier signal, thereby transforming the computer system 700 in FIG. 7 to a special purpose machine for implementing the described operations.

The I/O section 704 is connected to one or more user-interface devices (e.g., a keyboard 716 and a display unit 718), a disk storage unit 712, and a disk drive unit 720. Generally, in contemporary systems, the disk drive unit 720 is a DVD/CD-ROM drive unit capable of reading the DVD/CD-ROM medium 710, which typically contains programs and data 722. Computer program products containing mechanisms to effectuate the systems and methods in accordance with the described technology may reside in the memory section 704, on a disk storage unit 712, or on the DVD/CD-ROM medium 710 of such a system 700. Alternatively, a disk drive unit 720 may be replaced or supplemented by a floppy drive unit, a tape drive unit, or other storage medium drive unit. The network adapter 724 is capable of connecting the computer system to a network via the network link 714, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based, or other operating system. It should be understood that computing systems may also embody devices such as Personal Digital Assistants (PDAs), mobile phones, gaming consoles, set top boxes, etc.

When used in a LAN-networking environment, the computer system 700 is connected (by wired connection or wirelessly) to a local network through the network interface or adapter 724, which is one type of communications device. When used in a WAN-networking environment, the computer system 700 typically includes a modem, a network adapter, or any other type of communications device for establishing communications over the wide area network. In a networked environment, program modules depicted relative to the computer system 700 or portions thereof, may be stored in a remote memory storage device. It is appreciated that the network connections shown are exemplary and other means of and communications devices for establishing a communications link between the computers may be used.

In an example implementation, BIOS, operating systems, and applications may be stored in a storage device or memory and executed by a processor, such as central process unit (CPU). A shadow MBR, an MBR, and a reserved data region may be stored as program data in memory 708 or other storage systems, such as disk storage unit 712. It should also be understood that the described technology may be employed outside of a general purpose computer, such as in mobile media devices, special purposes computing systems, vehicles, and other electronic devices employing storage devices.

The embodiments of the invention described herein may be implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. An apparatus comprising:
an interface connectable to a data bus;
a primary master boot record (MBR);
an alternate master boot record (MBR) that includes instructions for unlocking the apparatus;
a control circuit configured to:
selectively implement a first security protocol between the interface and a device connected to the data bus;
receive an unlock command and check a password against one or more passwords stored in the alternate MBR to selectively unlock one or more portions of the data storage device protected by the first security protocol;
selectively implement a second security protocol between the interface and the device connected to the data bus;
the first security protocol and the second security protocol manage the device's access to the apparatus;
redirecting a read of the primary MBR to read the alternate MBR when the apparatus is locked and a host attempts to read the primary MBR from the apparatus; and
when the apparatus is unlocked, deactivate the alternate MBR and implement the primary MBR.

2. The apparatus of claim 1 further comprising the first security protocol implements security with data encryption and the second security protocol does not implement security through data encryption.

3. The apparatus of claim 2 further comprising the first security protocol complies with a Trusted Computing Group (TCG) security protocol and the second security protocol complies with an AT Attachment (ATA) security protocol.

4. The apparatus of claim 3 further comprising the control circuit configured to overwrite a TCG default Security ID (SID) password with an ATA security password in response to receipt of an ATA security enable command and the control circuit configured to restore the TCG default SID password in response to receipt of an ATA security disable command.

5. The apparatus of claim 3 further comprising the control circuit configured to receive and validate a TCG password for unlocking one or more portions of a data storage medium locked using an ATA lock command.

6. The apparatus of claim 3 further comprising the control circuit configured to check a TCG password received with an ATA unlock command against a TCG password associated with one or more portions of a data storage medium.

7. The apparatus of claim 6 further comprising the control circuit configured to unlock at least one portion of the data storage medium when the TCG password matches a respective TCG password of the at least one portion.

8. The apparatus of claim 1 wherein the apparatus comprises a data storage device and the interface includes a connector to connect to the data bus.

9. The apparatus of claim 8 further comprising the first security protocol complies with a Trusted Computing Group (TCG) security protocol and the second security protocol complies with an AT Attachment (ATA) security protocol.

10. The apparatus of claim 8 wherein the data storage device further includes a magnetic disc data storage medium.

11. The apparatus of claim 8 wherein the data storage device further includes a non-volatile solid state data storage medium.

12. The apparatus of claim 1 further comprising the control circuit configured to selectively implement the first security protocol and the second security protocol based on defined transitions that determine which security protocol is selected to manage security for the apparatus.

13. The apparatus of claim 12 further comprising a no security state in which the apparatus is not protected by either security protocol; and the control circuit is configured to selectively implement the first security protocol, the second security protocol, and the no security state.

14. A system comprising:
a data storage device including:
a nonvolatile data storage medium;
an interface coupleable to a data bus;
a primary master boot record (MBR);
an alternate master boot record (MBR) that includes instructions for unlocking the data storage device and for resetting a BIOS of a host;

a control circuit configured to:
  selectively implement a first security protocol;
  selectively implement a second security protocol different than the first security protocol;
  the first security protocol and the second security protocol manage access to the data storage device via the data bus;
  when the data storage device is locked and the BIOS of the host attempts to read the primary MBR from the data storage device, redirecting the read of the primary MBR to read the alternate MBR;
  when the data storage device is unlocked, deactivate the alternate MBR, and initiate a reset of the BIOS to boot to the primary MBR; and
  provide access by host applications to unlocked data recorded on the nonvolatile data storage device medium until the data storage device is powered down or locked.

15. The system of claim 14 wherein the data storage device further comprises the control circuit configured to selectively implement the first security protocol and the second security protocol based on defined transitions that determine which security protocol is selected to manage access to the data storage device.

16. The system of claim 15 wherein the data storage device further comprises a no security state in which the data storage device is not protected by either security protocol; and the control circuit is configure to selectively implement the first security protocol, the second security protocol, and the no security state.

17. The system of claim 14 wherein the data storage device further comprises the first security protocol complies with a Trusted Computing Group (TCG) security protocol and the second security protocol complies with an AT Attachment (ATA) security protocol.

18. The system of claim 14 further comprising:
  a host computer including a Basic Input/Output System (BIOS) that does not support the first security protocol, wherein the data storage device does support the first security protocol;
  the data bus coupled to the data storage device to receive commands and data from the host computer and BIOS;
  a command, stored within the BIOS, to provide management of the first security protocol.

19. The system of claim 18 further comprising:
  the host computer configured to execute software that supports the first security protocol;
  the command is an unlock command compatible with the second security protocol and the unlock command includes a password compatible with the first security protocol even though the BIOS does not support the first security protocol;
  the data storage device is configured to receive the unlock command and check the password against one or more passwords stored in the alternate MBR to selectively unlock one or more portions of the data storage device protected by the first security protocol; and
  when at least a portion of the data storage device is unlocked, processing control is provided to the software to allow access to an unlocked portion of the data storage device.

* * * * *